(12) United States Patent
Kawakami et al.

(10) Patent No.: US 6,706,328 B2
(45) Date of Patent: Mar. 16, 2004

(54) METAL SHEET MATERIAL WITH SUPERIOR CORROSION RESISTANCE

(75) Inventors: Katsuyuki Kawakami, Tokyo (JP); Mitsuru Nakamura, Kanagawa-pref. (JP); Takao Ogino, Kanagawa-pref. (JP)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/220,106

(22) PCT Filed: Feb. 28, 2001

(86) PCT No.: PCT/US01/06267

§ 371 (c)(1), (2), (4) Date: Dec. 23, 2002

(87) PCT Pub. No.: WO10/64356

PCT Pub. Date: Sep. 7, 2001

(65) Prior Publication Data

US 2003/0211249 A1 Nov. 13, 2003

(30) Foreign Application Priority Data

Feb. 28, 2000 (JP) .......................................... 2000-050415

(51) Int. Cl.⁷ .............................. B05D 3/02; B05D 7/16

(52) U.S. Cl. ........................................ 427/387; 427/386
(58) Field of Search .................................. 427/386, 387

(56) References Cited

U.S. PATENT DOCUMENTS

| | | | |
|---|---|---|---|
| 3,907,613 A | 9/1975 | Bures et al. | |
| 4,330,446 A | 5/1982 | Miyosawa | |
| 5,246,507 A | 9/1993 | Kodama et al. | |

FOREIGN PATENT DOCUMENTS

| | | | |
|---|---|---|---|
| JP | S53-121034 | | 10/1978 |
| JP | S57-44751 | | 9/1982 |
| JP | 63-154774 | * | 6/1988 |
| JP | H1-177380 | | 7/1989 |
| JP | 09-241576 A2 | | 9/1997 |

* cited by examiner

Primary Examiner—Erma Cameron
(74) Attorney, Agent, or Firm—Stephen D. Harper; Mary K. Cameron

(57) ABSTRACT

A metal article whose surface is coated with a coating composition composed of (A) a silane coupling agent component, (B) a polymer component having a specific chemical structure, and (C) a wax component provides a chromium-free surface treated metal material with superior corrosion resistance, paintability, fingerprint resistance, and workability.

22 Claims, No Drawings

METAL SHEET MATERIAL WITH SUPERIOR CORROSION RESISTANCE

RELATED APPLICATIONS

This application claims priority from International Application No. PCT/US01/06267, filed Feb. 28, 2001, and published in English, and Japanese application 2000-050415, filed Feb. 28, 2000.

BACKGROUND OF THE INVENTION

The present invention relates to a metal sheet material that has at least one of superior corrosion resistance, paintability, fingerprint resistance, and workability and that is used in consumer electrical and electronic products, building materials, and the like.

Metal sheet materials such as steel sheets, aluminum-plated steel sheets, zinc-plated steel sheets, and aluminum sheets are commonly used in a wide range of fields related to automobiles, building materials, and consumer electrical and electronic products. Zinc and aluminum, however, corrode in the atmosphere and generate corrosion products (known as white rust), which mar the appearance of the metal material and also adversely affect the paintability of the material. Furthermore, the material is susceptible to fingerprints and other soiling when handled by workers in the course of the various steps of manufacturing the finished product at the user's plant; such soiling can markedly lower the commercial value of the product. Also, oils and the like are used as lubricants in pressing and other such working of the material, and this oil has to be removed after forming.

In view of this, in order to improve the corrosion resistance, paintability, fingerprint resistance, and workability of the above-mentioned metal material surfaces, the surface of a metal sheet material has been subjected to a chromate treatment using a treatment solution composed primarily of chromic acid, dichromic acid, or a salt thereof, after which the upper layer is coated with a polyolefin resin having carboxyl groups and containing colloidal silica and a wax or the like, or with a coating agent comprising a resin containing a lubricating component such as a wax (rather than imparting workability with an oil or the like), and these metal sheet materials have been used in press molding and other such applications.

Due to heightened awareness about environmental protection in recent years, however, there has been a move away from chromate treatments because the hexavalent chromium in the chromate treatment solutions used to treat metal material surfaces has a direct and adverse effect on humans. Wastewater containing hexavalent chromium also requires special treatment as set forth in various laws and regulations, and this leads to a considerable Increase in the overall cost. Also, a metal material that has undergone a chromate treatment becomes an industrial waste containing chromium, which is a serious drawback because such material cannot be recycled, and this poses problems for society.

Another well-known surface treatment method other than using a chromate involves the use of tannic acid and/or another polyvalent phenol carboxylic add. When a metal material is treated with an aqueous solution of tannic acid, the protective film formed by a reaction between the tannic acid and the metal material becomes a barrier to the infiltration of corrosive substances, so that the corrosion resistance of the metal material is believed to be improved.

Still, the need for ever higher quality in products today makes it necessary for the protective film itself to have high corrosion resistance, and the use of tannic acid by itself, or along with an inorganic component in the cover film, has not afforded sufficient corrosion resistance, and practical use is therefore impossible at the present time.

In view of this, a method in which a metal surface is coated with an aqueous solution composed of water-dispersible silica, an alkyd resin, and a trialkoxysilane compound has been disclosed in Japanese Laid-Open Patent Application S53-121034 as a treatment method that improves the corrosion resistance of a metal material.

A surface treatment method aimed at imparting corrosion resistance to a metal material by using a water-soluble resin composed of a hydroxypyrrone derivative and a method in which corrosion resistance is imparted by using a water-soluble or water-dispersible polymer of a hydroxystyrene compound have been disclosed in Japanese Patent Publication S57-44751, Japanese Laid-Open Patent Application H1-177380, and elsewhere.

Unfortunately, none of the above methods has allowed the formation of a film capable of imparting corrosion resistance good enough to replace a chromate film on a metal material surface, so the current problems discussed above have not been solved. At present, therefore, there is yet to be found a non chromium-based surface treatment agent or method for a metal material with excellent corrosion resistance.

The present invention is intended to solve the above problems encountered with prior art, and it is an object of the invention to provide a chromium free surface treated metal material with at least one, more preferably more than one, or most preferably all, of superior corrosion resistance, paintability, fingerprint resistance, and workability.

BRIEF SUMMARY OF THE INVENTION

There has been discovered a metal sheet material with superior corrosion resistance, paintability, fingerprint resistance, and workability, and a method for manufacturing this material, which is accomplished by coating the surface of a metal sheet material with a composition composed of a silane coupling agent component, a polymer component having a specific chemical structure, and a wax component.

DETAILED DESCRIPTION OF THE INVENTION AND PREFERRED EMBODIMENTS

A coating composition according to the invention comprises, preferably consists essentially of, or more preferably consists of, the following components:

(A) a silane coupling agent component comprised of at least one type of silane coupling compound having one or more reactive functional moieties selected from among active hydrogen-containing amino moieties, epoxy moieties, vinyl moieties, mercapto moieties, and methacryloxy moieties;

(B) a polymer component comprising at least one type of polymer that: conforms to the following General Formula 1:

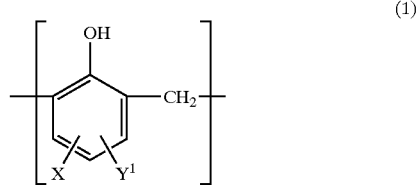

where, independently for each instance of General Formula 1 in the polymer:

$Y^1$ represents a hydrogen atom or a "Z" moiety that conforms to one of the following General Formulas, 3 or 4:

(3)

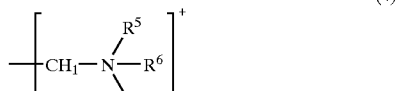

(4)

where each of $R^3$, $R^4$, $R^5$, $R^6$, and $R^7$ independently represents a hydrogen atom, a $C_1$ to $C_{10}$ alkyl moiety, or a $C_1$ to $C_{10}$ hydroxyalkyl moiety; and X represents a hydrogen atom, a hydroxyl moiety, a $C_1$ to $C_5$ alkyl moiety, a $C_1$ to $C_5$ hydroxyalkyl moiety, a $C_6$ to $C_{12}$ aryl moiety, a benzyl moiety, a benzal moiety, an unsaturated hydrocarbon moiety forming a naphthalene ring by condensation with the benzene ring to which the general formula shows X is bonded, or a moiety conforming to the following General Formula 2:

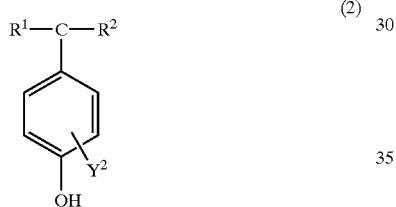

(2)

where:
each of $R^1$ and $R^2$ independently represents a hydrogen atom, a hydroxyl moiety, a $C_1$ to $C_5$ alkyl moiety, or $C_1$ to $C_{10}$ hydroxyalkyl moiety (if these moieties have eleven or more carbons, there will be a drop in the film formability of the resulting coating composition, so that corrosion resistance, paintability, fingerprint resistance, and/or workability may be inadequate); and $Y^2$ represents a hydrogen atom or a "Z" moiety as described above;

has an average degree of polymerization (i.e., number of units as represented by General Formula 1 per molecule of the polymer, the degree of polymerization may hereinafter be designated as "n") of 2 to 50; and has a number of Z moieties that has a ratio to the number of benzene rings that is from 0.2 to 1.0 (if this average number of Z moiety substitutions is less than 0.2, the resulting polymer may not adhere well to the metal material and paintability may be poor; while the resulting polymer will be more hydrophilic if this number is over 1.0, the resulting metal sheet material may have insufficient corrosion resistance); and (C) a wax component.

The weight ratio of the silane coupling agent component (A) to the polymer component (B) preferably is from: 1:10 to 10:1, a range of 1:1 to 5:1 being more preferred. If this weight ratio is less than 1:10, that is, if the proportion of the silane coupling agent component (A) is too low, there will be a decrease in adhesion with the substrate surface, so corrosion resistance and paintability may be inadequate. On the other hand, if this ratio is over 10:1, that is, if the proportion of the silane coupling agent component (A) is too high, there will be a decrease in the film formability of the coating composition, and the resulting metal sheet material may have inadequate corrosion resistance and paintability.

Independently, the silane coupling agent component (A) preferably includes at least two subcomponents:

(A.1) a silane coupling agent selected from the group consisting of silane coupling molecules having at least one active hydrogen-containing amino moiety; and (A.2) a silane coupling agent selected from the group consisting of silane coupling molecules having at least one epoxy moiety.

When the silane coupling agent does include both subcomponents (A.1) and (A.2) as described above:

the ratio of the number of equivalents of the active hydrogen-containing amino moieties in subcomponent (A.1) to the number of epoxy moieties contained in subcomponent (A.2) preferably is from 3:1 to 1:3 (if the equivalent ratio of the active hydrogen-containing amino moieties to the epoxy moieties is over 3:1, the film formability of the coating composition often will be poor, and the resulting metal sheet material may not have adequate corrosion resistance, paintability, or workability; if this ratio is less than 1:3, though, there is not likely to be further improvement in the corrosion resistance, paintability, fingerprint resistance, or workability of the coated metal sheet material, so that such ratios are uneconomical); and, independently, the weight ratio of the combined amounts of the subcomponent (A.1) and subcomponent (A.2) to the amount of polymer in component (B) preferably is from 1:5 to 5:1.

Independently for each, it is also preferable for:

the weight ratio of wax component (C) to the total of silane coupling agent component (A) and polymer component (B) to be from 1:100 to 2:1 (fingerprint resistance and workability may be inadequate if the wax component (C) is present in a ratio of less than 1:100, and the film formability of the coating composition will be reduced if this ratio is over 2:1, so the resulting metal sheet material may have inadequate corrosion resistance and paintability); and the wax in component (C) to have a melting point of 40 to 120° C. (workability may be unsatisfactory in a metal sheet material obtained using a wax component having a melting point outside this range).

Specific examples of suitable silane coupling agents include the following five categories: (1) Compounds having amino moieties, e.g., N-(2-aminoethyl)-3-aminopropylmethyldimethoxysilane, N-(aminoethyl)-3aminopropyltrimethoxysilane, 3-aminopropyltrimethoxysilane; (2) Compounds having epoxy moieties, e.g., 3-glycidoxypropyltrimethoxysilane, 3-glycidoxypropylmethyldimethoxysilane, 2-(3,4-epoxycyclohexyl)ethyltrimethoxysilane; (3) Compounds having vinyl moieties, e.g., vinyltriethoxysilane; (4) Compounds having mercapto moieties, e.g., 3-mercaptopropyltrimethoxysilane; and (5) Compounds having methacryloxy moieties, e.g., 3-methacryloxypropyltrimethoxysilane, 3-methacryloxypropylmethyldimethoxysilane.

It is preferable for the dry coating weight (i.e., the total weight of components A, B, and C) on the: metal sheet material surface in the present invention to be 0.01 to 3.0 g/m², or more preferably 0.05 to 1.5 g/m². If this coating weight is less than 0.01 g/m², the resulting metal sheet material may have inadequate corrosion resistance, fingerprint resistance, and/or workability. If this weight goes over 3.0 g/m², though, paintability and/or adhesion in particular may deteriorate.

In a manufacturing process according to this invention, the above-noted necessary components of the coating composition are preferably mixed with water to form an aqueous composition containing the coating composition that is applied to the metal sheet material to form a liquid coating that preferably is dried by heating. The pH of the aqueous composition preferably is within a range of 2.0 to 6.5, which may be achieved by mixing the other ingredients with one or more of, for example, phosphoric acid, sulfuric acid, hydrochloric acid, nitric acid, hydrofluoric add, a complex fluoride, or an organic acid. It is preferable to use phosphoric acid, an acidic phosphate, a fluoride, or a complex fluoride to adjust the pH of the aqueous composition used in the manufacturing method of the present invention. A more preferred pH range is 3.0 to 5.0. If the pH is less than 2.0, reactivity will be high between the substrate surface and the coating composition in the obtained aqueous composition, so that coating defects may occur and the resulting metal sheet material may have inadequate corrosion resistance, paintability, fingerprint resistance, and/or workability. If the pH is over 6.5, though, the water-soluble polymer component (B) itself will tend to precipitate out of the aqueous composition, and If such precipitation actually occurs, it will shorten the usable life of the aqueous composition.

There are no particular restrictions on the method for coating the surface of the metal material with this aqueous composition; coating can be accomplished, for example, by dipping, spraying, roll coating, and the like. It is also preferable for the coated metal material to be dried by heating. As for the heating temperature, the maximum temperature of the metal sheet material preferably is between 50 and 180° C.

When the metal material and the aqueous composition used in the manufacturing method of the present invention come into contact, metal ions dissolved from the metal material and admixed with the aqueous composition may form a complex with the water-soluble polymer component (B), producing sediment. If this happens, a metal sequestering agent preferably is added to the surface treatment agent composition to prevent such precipitation. Effective metal sequestering agents include EDTA, Cy-DTA, triethanolamine, gluconic acid, heptoglycolic acid, oxalic acid, tartaric add, malic acid, and organic sulfonic acids.

A surfactant for enhancing applicability may also be added to the aqueous composition used in the manufacturing method of the present invention. Examples of surfactants include commercially available carboxylate types, sulfuric ester types, sulfonate types, phosphate ester types, and other such anionic surfactants, polyethylene glycol type nonionic surfactants, polyhydric alcohol type nonionic surfactants, and amine-based cationic surfactants.

Steel sheets, zinc-plated steel sheets, aluminum-plated steel sheets, aluminum alloy sheets, stainless steel sheets, copper sheets, and the like can be chosen for the metal material used in the present invention.

The invention may be further appreciated by consideration of the following working, but the scope of the present invention is not in any way limited by these examples except to whatever extent may be indicated in the appended claims.

1. Test Materials

The following test substrate metals were used, with abbreviations for the substrates that are used in tables later being shown in parentheses after the description of each type: 0.6 millimeter (hereinafter usually abbreviated as "mm") thick hot galvanized steel sheet (GI); 0.6 mm thick electrogalvanized steel sheet (EG); 0.8 mm thick galvanized steel sheet containing 5% aluminum in the galvanizing layer (GF); 0.8 mm thick galvanized steel sheet containing 55% aluminum in the galvanizing layer (GL); and 0.6 mm thick aluminum alloy sheet according to Japanese Industrial Standard (hereinafter usually abbreviated as "JIS") A 5052 (AL)

2. Cleaning the Test Substrates

Any dirt or oil adhering to the surface of the above metal material was removed by treating the surface with a solution in water of FINECLEANER® 4336 medium-strength alkaline degreaser, made by Nihon Parkerizing and used in a concentration of 20 g/liter, at a treatment temperature of 60° C. and for a duration of 20 seconds. Any alkaline components remaining on the surface were then rinsed off with tap water, thereby cleaning the surface of the test substrate.

3. Aqueous Composition Examples

Aqueous Composition (A)

3-Mercaptopropyltrimethoxysilane was used as the silane coupling agent component (A); the water-soluble polymer component (B) was such that n=5, X=hydrogen, and $Y^1=Z=-CH_2N(CH_3)_2$ in General Formula 1, so that the average number of Z moieties per benzene ring=1; and the weight ratio of component (A) to component (B) was 1:8. The pH of this mixture was then adjusted to 3.0 with $H_2SiF_6$, and a dispersion of carnauba wax with a melting point of 82° C. was added as the wax component (C) in an amount such that the ratio by weight of wax to the combined weight of components (A) and (B) was 1:5, and the resulting composition was diluted with deionized water to a total solids content of 10% by weight.

Aqueous Composition B

N-(2-aminoethyl)-3-aminopropyltrirnethoxysilane was used as the silane coupling agent component (A); the water-soluble polymer component B was such that n=5, $X=-CH_2-C_6H_4-OH$, and $Y^1=Z=-CH_2N(CH_3)_2$ in General Formula 1, so that the average number of Z moieties per benzene ring=0.50; and the ratio by weight of component (A) to component (B) was 5:1. The pH was adjusted to 4.0 with HF; a dispersion of polyethylene oxide wax with a melting point of 104° C. was added as the wax component (C) in an amount such that the ratio by weight of wax to the combined weight of components (A) and (B) was=1:100; and the resulting composition was diluted with deionized water to a solids content of 10% by weight.

Aqueous Composition C

3-Aminopropyltriethoxysilane and 3-glycidoxypropylmethyldimethoxysilane with an equivalent ratio of amino moiety active hydrogens to epoxy moieties=1:2 were used as the silane coupling agent component (A); the water-soluble polymer component (B) was such that n=6, one third of $X=-CH_2-C_6H_4-OH$ and the remainder of X=H, and $Y^1=Z=-CH_2N(CH_3)_2$, so that the average number of Z moieties per benzene ring=0.75, and the ratio by weight of component (A) to component (B) was 1:1. The pH was adjusted to 4.0 with $H_2TiF_6$, a dispersion of montan wax with a melting point of 79° C. was admixed as the wax component (C) the ratio by weight of wax to the combined weight of components (A) and (B) was 2:1, and the resulting composition was diluted with deionized water to a solids content of 10% by weight.

Aqueous composition D

N-(2-aminoethyl)-3-aminopropyltrimethoxysilane and 3-glycidoxypropylmethyldimethoxysilane, with a ratio of equivalents of amino moiety active hydrogens to equivalents of epoxy moieties=1:2, were used as the silane coupling agent component (A); the water-soluble polymer component B was such that n=5, X=—$CH_2$—$C_6H_4$—OH, $Y^1$=Z=—$CH_2N(CH_3)_2$ in General Formula 1; the ratio of the number of Z moieties to the number of benzene rings was=0.5; and the ratio by weight of component (A) to component (B) was 1:1. The pH was adjusted to 3.0 with phosphoric acid, a dispersion of paraffin wax with a melting point of 40° C. was added as the wax component C such that the ratio by weight of wax to the combined weight of components (A) and (B) was 1:1, and the resulting composition was diluted with deionized water to a solids content of 10% by weight.

Aqueous composition E

N-(2-aminoethyl)-3-aminopropyltrirnethoxysilane and 3-glycidoxypropylmethyldimethoxysilane, with a ratio of equivalents of amino moiety active hydrogens to equivalents of epoxy moieties=1:1, were used as the silane coupling agent component (A); the water-soluble polymer component B was such that n=5, X=hydrogen, $Y^1$=Z=—$CH_2N(CH_3)_2$ in General Formula 1, the ratio of Z moieties to benzene rings=0.1, and the weight ratio of component (A) to component (B) was 1:1. The pH was adjusted to 4.0 with phosphoric acid, a dispersion of polyethylene wax with a melting point of 120° C. was added as the wax component C such that the ratio by weight of wax to the combined weight of components (A) and (B) was 1:50, and the resulting composition was diluted with deionized water to a solids content of 10% by weight.

Aqueous Composition F

N-(2-aminoethyl)-3-aminopropyltrimethoxysilane was used as the silane coupling agent component (A); the water-soluble polymer component B was such that n=5, X=—$CH_2$—$C_6H_4$—OH, and $Y^1$=Z=—$CH_2N(CH_3)_2$ in General Formula 1, so that the ratio of Z moieties to benzene rings was 0.50; and the weight ratio of component (A) to component (B) was 5:1. The pH was adjusted to 4.0 with HF, a dispersion of lanolin with a melting point of 34° C. was added as the wax component C such that the ratio by weight of wax to the combined weight of components (A) and (B) was 1:20, and the resulting composition was diluted with deionized water to a solids content of 10% by weight.

Aqueous Composition G

3-Aminopropyltriethoxysilane and 3-glycidoxypropylmethyldimethoxysilane. with a ratio of equivalents of amino, moiety active hydrogens to epoxy moieties=1:2, were used as the silane coupling agent component (A); the water-soluble polymer component (B) was such that n=5, X=—$CH_2$—$C_6H_4$—OH, and $Y^1$=Z=—$CH_2N(CH_3)_2$ in General Formula 1, and the ratio of Z moieties to benzene rings=0.5; and the weight ratio of component (A) to component (B) was 1:1. The pH was adjusted to 4.0 with $H_2TiF_6$, and the composition was diluted with deionized water to a solids content of 10% by weight.

Aqueous Composition H

N-(2-aminoethyl)-3-aminopropyltrimethoxysilane and 3-glycidoxypropylmethyldimethoxysilane, with a ratio of equivalents of amino moieties with active hydrogens to equivalents of epoxy moieties=1:2, were used as the silane coupling agent component (A); the water-soluble polymer component (B) was such that n=5, X=—$CH_2$—$C_6H_4$—OH and $Y^1$=Z=—$CH_2N(CH_3)_2$ in General Formula 1, and the ratio of the number of Z moieties to the number of benzene rings was 0.5; and the weight ratio of component (A) to component (B) was 1:1. The pH was adjusted to 3.0 with phosphoric acid, a dispersion of polyethylene wax with a melting point of 120° C. was added as the wax component (C) such that the ratio by weight of wax to the combined weight of components (A) and (B) was 3:1, and the resulting composition was diluted with deionized water to a solids content of 10% by weight 4. Process of Using Examples and Comparison Examples

EXAMPLE 1

A hot galvanized steel sheet (GI) was coated with aqueous composition (A) by roll coating such that the dry coating weight was 1.0 g/m$^2$, and this coating was dried at a maximum sheet temperature of 80° C.

EXAMPLE 2

An aluminum alloy sheet (AL) was coated with aqueous composition (B) by roll coating such that the dry coating weight was 0.01 g/m$^2$, and this coating was dried at a maximum sheet temperature of 150° C.

EXAMPLE 3

A hot galvanized steel sheet (GI) was coated with aqueous composition (B) by roll coating such that the dry coating weight was 0.6 g/m$^2$, and this coating was dried at a maximum sheet temperature of 100° C.

EXAMPLE 4

An electrogalvanized steel sheet (EG) was coated with aqueous composition (C) by roll coating such that the dry coating weight was 1.5 g/m$^2$, and this coating was dried at a maximum sheet temperature of 180° C.

EXAMPLE 5

An electrogalvanized steel sheet (EG) was coated with aqueous composition (D) by roll coating such that the dry coating weight was 3.0 g/m$^2$, and this coating was dried at a maximum sheet temperature of 80° C.

EXAMPLE 6

A hot galvanized steel sheet (GI) was coated with aqueous composition (E) by roll coating such that the dry coating weight was 0.06 g/m$^2$, and this coating was dried at a maximum sheet temperature of 80° C.

EXAMPLE 7

A hot galvanized steel sheet (GI) was coated with aqueous composition (E) by roll coating such that the dry coating weight was 2.5 g/m$^2$, and this coating was dried at a maximum sheet temperature of 80° C.

EXAMPLE 8

A galvanized steel sheet containing 5% aluminum in the galvanizing layer (GF) was coated with aqueous composition (A) by roll coating such that the dry coating weight was 0.5 g/m$^2$, and this coating was dried at a maximum sheet temperature of 80° C.

EXAMPLE 9

A galvanized steel sheet containing 55% aluminum in the galvanizing layer (GL) was coated with aqueous composition (A) by roll coating such that the dry coating weight was 1.5 g/m², and this coating was dried at a maximum sheet temperature of 60° C.

Comparative Example 1

A hot galvanized steel sheet (GI) was coated with aqueous composition (C) by roll coating such that the dry coating weight was 0.006 g/m², and this coating was dried at a maximum sheet temperature of 80° C.

Comparative Example 2

An electrogalvanized steel sheet (EG) was coated with aqueous composition (A) by roll coating such that the dry coating weight was 4.0 g/m², and this coating was dried at a maximum sheet temperature of 80° C.

Comparative Example 3

An aluminum alloy sheet (AL) was coated with aqueous composition (F) by roll coating such that the dry coating weight was 1.5 g/m², and this coating was dried at a maximum sheet temperature of 180° C.

Comparative Example 4

An electrogalvanized steel sheet (EG) was coated with aqueous composition (G) by roll coating such that the dry coating weight was 2.0 g/m², and this coating was dried at a maximum sheet temperature of 180° C.

Comparative Example 5

A hot galvanized steel sheet (GI) was coated with aqueous composition (H) by roll coating such that the dry coating weight was 1.0 g/m², and this coating was dried at a maximum sheet temperature of 80° C.

5. Evaluation Testing

Evaluations were conducted by the following methods, the results of which are given in Table 1.

5.1 Corrosion Resistance Test

The metal sheet material samples were subjected to a saltwater spray test as set forth in JIS Z 2371 for 240 hours. White rust resistance was measured and evaluated visually. The evaluation criteria are given below.

⊚: less than 5% white rusting
○: at least 5% but less than 10% white rusting
Δ: at least 10% but less than 50% white rusting
x: at least 50% white rusting

5.2 Paint Adhesion Test

Each of the various metal sheet materials was painted under the following conditions and subjected to a paint adhesion test.

Painting conditions: AMILAC™ #1000 white paint made by Kansai Paint; painting method: bar coating to a 25 μm dry film thickness; baked at 140° C. for 20 minutes.

Primary adhesion test The coating film was scored in a 100-square checkerboard pattern with an NT cutter, this test-piece was pulled out 5 mm with an Eriksen tester, and a peel test was then conducted with adhesive tape over the pulled bumps. An evaluation was made from the number of squares of coating film that peeled off. The evaluation results are given below.

⊚: no peeling
○: 1 to 10 squares peeled off
Δ: 11 to 50 squares peeled off
x: 51 to 100 squares peeled off.

5.3 Corrosion Resistance after Painting

The coating film was scratched with a cutter all the way down to the steel sheet base, and a saltwater spray test was conducted for 240 hours as set forth in JIS Z 2371. After this test, tape was applied to the cut portion and peeled off, and an evaluation was made from the peeling width. This evaluation involved measuring the coating film peeling; width (mm) from the cut portion.

⊚: less than 3 mm
○: at least 3 mm but less than 5 mm
Δ: at least 5 mm but less than 10 mm
x: at least 10 mm.

5.4 Fingerprint Resistance Test

The L, a, and b values were measured ahead of time by colorimeter using each of the various metal sheet materials as the test piece, after which the test piece was coated with vaseline and wiped thoroughly with gauze, the L, a, and b values were measured once again by colorimeter, and $\Delta E$ was determined.

⊚: $\Delta E$=less than 0.2
○: $\Delta E$=at least 0.2 but less than 2.0
Δ: $\Delta E$=at least 2.0 but less than 3.0
x: $\Delta E$=at least 3.0

5.5 Workability test

Using each of the various metal sheet materials as the test piece, the initial coefficient of friction (hereinafter usually abbreviated as "$\mu$") at a load of 1 kilogram and the $\mu$ value after 10 passes were measured with a Bowden friction and wear tester. The results are reported on the following scale:

⊚: $\mu$ value=less than 0.1
○: $\mu$ value=at least 0.1 but less than 0.2
Δ: $\mu$ value=at least 0.2 but less than 0.3
x: $\mu$ value=at least 0.3.

TABLE 1

| Type of Test | Number | Substrate | Corrosion Resistance | Paint Adhesion | Corrosion Resistance after Painting | Fingerprint Resistance ($\Delta E$) | Coefficient of Friction (Value) | |
|---|---|---|---|---|---|---|---|---|
| | | | | | | | Initial | After 10 Passes |
| Examples | 1 | GI | ○ | ○ | ○ | ⊚ | ○ | ○ |
| | 2 | AL | ○ | ⊚ | ○ | ○ | ○ | ○ |
| | 3 | GI | ○ | ○ | ○ | ○ | ○ | ○ |
| | 4 | EG | ○ | ○ | ○ | ○ | ○ | ○ |

TABLE 1-continued

| Type of Test | Number | Substrate | Corrosion Resistance | Paint Adhesion | Corrosion Resistance after Painting | Fingerprint Resistance (_E) | Coefficient of Friction (Value) Initial | After 10 Passes |
|---|---|---|---|---|---|---|---|---|
| | 5 | EG | ○ | ○ | ○ | ○ | ○ | ○ |
| | 6 | GI | ○ | ⊙ | ○ | ○ | ○ | ○ |
| | 7 | GI | ⊙ | ○ | ○ | ○ | ⊙ | ○ |
| | 8 | GF | ○ | ○ | ⊙ | ○ | ○ | ○ |
| | 9 | GL | ⊙ | ○ | ⊙ | ○ | ⊙ | ○ |
| Comparative Examples | 1 | GI | X | ⊙ | Δ | X | Δ | X |
| | 2 | EG | ⊙ | X | X | ○ | ⊙ | ⊙ |
| | 3 | AL | ○ | X | X | X | X | X |
| | 4 | EG | ⊙ | ⊙ | ⊙ | X | X | X |
| | 5 | GI | X | X | X | X | ⊙ | ○ |

The following is clear from the results in Table 1:
(1) Examples 1 to 9, which are metal sheet materials of the present invention, exhibit good corrosion resistance, paint adhesion, corrosion resistance after painting, fingerprint resistance, and workability.
(2) Comparative Example 1, in which the coating amount is below the range of the present invention, has inferior corrosion resistance, fingerprint resistance, and workability.
(3) Comparative Example 2, in which the coating amount is over the range of the present invention, has inferior paint adhesion and corrosion resistance after painting.
(4) Comparative Example 3, which contains a wax whose melting point is below the range of the present invention, has inferior paint adhesion, corrosion resistance after painting, fingerprint resistance, and workability.
(5) Comparative Example 4, which contains no wax component and is therefore outside the scope of the present invention, does have adequate corrosion resistance and paintability, but lacks fingerprint resistance and workability.
(6) Comparative Example 5, in which the wax content is over the range of the present invention, does have adequate workability, but has inferior corrosion resistance, paint adhesion, corrosion resistance after painting, and fingerprint resistance., Benefits of the Invention A metal sheet material formed using a preferred manufacturing method of the present invention exhibits high corrosion resistance, paintability, fingerprint resistance, and workability without the use of a chromate as with conventional products. Accordingly, this material can be utilized in industries in which future wastewater restrictions will make it necessary to use chromium free materials. Furthermore, since there is no restriction with respect to the metal substrate, rustproofness and paintability can be improved while taking full advantage of the characteristics of a substrate. In addition, working is possible without the use of press oil or other oils, obviating the need for a degreasing step.

Finally, the present invention affords extremely effective and practical benefits in terms of environmental protection, recycling, and other societal concerns.

What is claimed is:
1. A process of making a corrosion-protected coated metallic article of manufacture, said process comprising:
forming over the surface of the metallic article to be protected a coating of a composition comprising:

(A) a silane coupling agent component comprised of at least one type of silane coupling compound having one or more reactive functional moieties selected from among active hydrogen-containing amino moieties, epoxy moieties, vinyl moieties, mercapto moieties, and methacryloxy moieties;
(B) a polymer component comprising at least one type of polymer that:
conforms to the following General Formula 1:

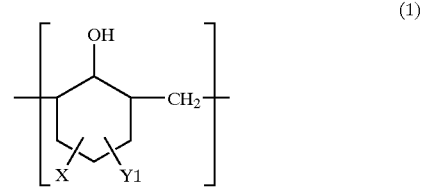

(1)

where, independently for each instance General Formula 1 in the polymer:
$Y^1$ represents a hydrogen atom or a "Z" moiety that conforms to one of the following General Formulas 3 or 4:

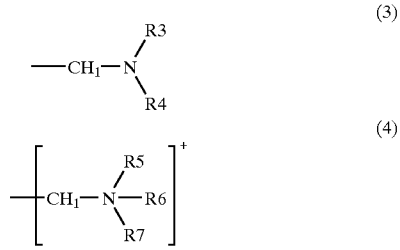

(3)

(4)

where each of $R^3$, $R^4$, $R^5$, $R^6$, and $R^7$ independently represents a hydrogen atom, a $C_1$ to $C_{10}$ alkyl moiety, or a $C_1$ to $C_{10}$ hydroxyalkyl moiety; and
X represents a hydrogen atom, a hydroxyl moiety, a $C_1$ to $C_5$ alkyl moiety, a $C_1$ to $C_5$ hydroxyalkyl moiety, a $C_8$ to $C_{12}$ aryl moiety, a benzyl moiety, a benzal moiety, an unsaturated hydrocarbon moiety forming a naphthalene ring by condensation with the benzene ring to which General Formula 1 shows X is bonded, or a moiety conforming to the following General Formula 2:

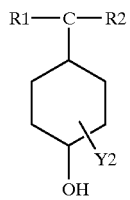

(2)

wherein:
each of $R^1$ and $R^2$ independently represents a hydrogen atom, a hydroxyl moiety, a $C_1$ to $C_5$ alkyl moiety, or $C_1$ to $C_{10}$ hydroxyalkyl moiety; and
$Y^2$ represents a hydrogen atom or a "Z" moiety as described above;
has an average degree of polymerization of 2 to 50; and
has a number of Z moieties that has a ratio to the number of benzene rings that is from 0.2 to 1.0; and
(C) a wax component.

2. A process according to claim 1, wherein the weight ratio of the silane coupling agent component (A) to the polymer component (B) is from 1:10 to 10:1, and the weight ratio of wax in component (C) to the total weight of silane coupling agent component (A) and the polymer component (B) is from 1:100 to 2:1.

3. A process according to claim 1, wherein the silane coupling agent component A includes as subcomponents:
(A.1) a silane coupling agent comprised of at least one type of silane coupling compound having at least one active hydrogen-containing amino moiety and
(A.2) a silane coupling agent comprised of at least one type of silane coupling compound having at least one epoxy moiety, and
the ratio of the number of equivalents of active hydrogen-containing amino moieties to the number of equivalents of epoxy moieties is from 3:1 to 1:3.

4. A process according to claim 3, wherein the weight ratio of the combined amount of the silane coupling agent subcomponent (A.1) and the silane coupling agent subcomponent (A.2) to component (B) is from 1:5 to 5:1.

5. A process according to claim 1, wherein the wax in component (C) has a melting point between 40 and 120° C.

6. A process according to claim 5, wherein:
said composition is an aqueous composition with a pH value from 2.0 to 6.5; and
the dry coating weight of the coating formed is from 0.01 to 3.0 g/m².

7. A process according to claim 4, wherein:
said composition is an aqueous composition with a pH value from 2.0 to 6.5; and
the dry coating weight of the coating formed is from 0.01 to 3.0 g/m².

8. A process according to claim 3, wherein:
said composition is an aqueous composition with a pH value from 2.0 to 6.5; and
the dry coating weight of the coating formed is from 0.01 to 3.0 g/m².

9. A process according to claim 2, wherein:
said composition aqueous with a pH value from 2.0 to 6.5; and
the dry coating weight of the coating formed is from 0.01 to 3.0 g/m².

10. A process according to claim 1, wherein:
said composition is an aqueous composition with a pH value from 2.0 to 6.5; and
the dry coating weight of the coating formed is from 0.01 to 3.0 g/m².

11. A process according to claim 1 wherein said composition is an aqueous composition and wherein said process comprises the additional operation of drying into place on the surface to be protected the aqueous composition.

12. The process according to claim 11 wherein during said drying the peak temperature of the metallic substrate is from 50 to 180° C.

13. A corrosion-protected coated metallic article made by a process according to any one of claims 1 through 12.

14. A coating composition for protecting the surface of a metallic article from corrosion, comprising:
(A) a silane coupling agent component of at least one type of silane coupling compound having one or more reactive functional moieties selected from among active hydrogen-containing amino moieties, epoxy moieties, vinyl moieties, mercapto moieties, and methacryloxy moieties;
(B) a polymer component including at least one type of polymer that:
conforms to the following General Formula 1:

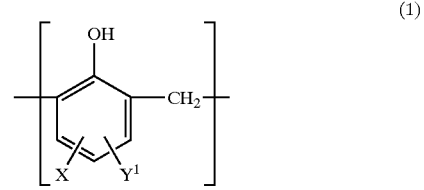

(1)

where, independently for each instance General Formula 1 in the polymer:
$Y^1$ represents a hydrogen atom or a "Z" moiety that conforms to one of the following General Formulas 3 or 4:

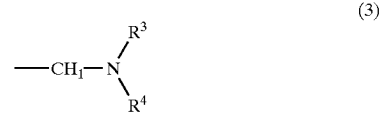

(3)

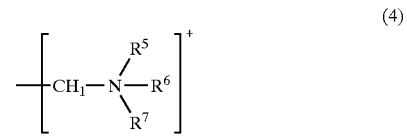

(4)

where each of $R^3$, $R^4$, $R^5$, $R^6$, and $R^7$ independently represents a hydrogen atom, a $C_1$ to $C_{10}$ alkyl moiety, or a $C_1$ to $C_{10}$ hydroxyalkyl moiety; and
X represents a hydrogen atom, a hydroxyl moiety, a $C_1$ to $C_5$ alkyl moiety, a $C_1$ to $C_5$ hydroxyalkyl moiety, a $C_6$ to $C_{12}$ aryl moiety, a benzyl moiety, a benzal moiety, an unsaturated hydrocarbon moiety forming a naphthalene ring by condensation with the benzene ring to which General Formula 1 shows X is bonded, or a moiety conforming to the following General Formula 2:
where:
each of $R^1$ and $R^2$ independently represents a hydrogen atom, a hydroxyl moiety, a $C_1$ to $C_5$ alkyl moiety, or $C_1$ to $C_{10}$ hydroxyalkyl moiety; and
$Y^2$ represents a hydrogen atom or a "Z" moiety as described above;

has an average degree of polymerization of 2 to 50; and has a number of Z moieties that has a ratio to the number of benzene rings that is from 0.2 to 1.0; and (C) a wax component.

15. A coating composition according to claim 14, wherein the weight ratio of the silane coupling agent component (A) to the polymer component (B) is from 1:10 to 10:1.

16. A coating composition according to claim 14, wherein the weight ratio of wax in component (C) to the total weight of silane coupling agent component (A) and the polymer component (B) is from 1:100 to 2:1.

17. A coating composition according to claim 14, wherein the silane coupling agent component A includes as subcomponents:

(A.1) a silane coupling agent composed of at least one type of silane coupling compound having at least one active hydrogen-containing amino moiety and (A.2) a silane coupling agent composed of at least one type of silane coupling compound having at least one epoxy moiety, and the ratio of the number of equivalents of active hydrogen-containing amino moieties to the number of equivalents of epoxy moieties is from 3:1 to 1:3.

18. A coating composition according to claim 17, wherein the weight ratio of the combined amount of the silane coupling agent subcomponent (A.1) and the silane coupling agent subcomponent (A.2) to component (B) is from 1:5 to 5:1.

19. A coating composition according to claim 14, wherein the wax in component (C) has a melting point between 40 and 120° C.

20. A coating composition according to claim 14 comprising an aqueous composition with a pH value from 2.0 to 6.5.

21. A coating composition according to claim 14 comprising an aqueous composition with a pH value from 3.0 to 5.0.

22. A coating composition according to claim 14, wherein the silane coupling agent of component (A) is selected from one or more of N-(2-aminoethyl)-3-aminopropylmethyl-dimethoxysilane, N-(aminoethyl)-3-aminopropyltri-methoxysilane, 3-aminopropyltriethoxysilane, 3-glycidoxypropyltrimethoxysilane, 3-glycidoxy-propylmethyl-dimethoxysilane, 2-(3,4-epoxycyclohexyl) ethyltrimethoxysilane, vinyltriethoxysilane, 3-mercapto-propyltrimethoxysilane, 3-methacryloxypropyltrimethoxy-silane, and 3-methacryloxypropylmethyldimethoxysilane.

* * * * *

UNITED STATES PATENT AND TRADEMARK OFFICE
CERTIFICATE OF CORRECTION

PATENT NO. : 6,706,328 B2
DATED : March 16, 2004
INVENTOR(S) : Kawakami et al.

It is certified that error appears in the above-identified patent and that said Letters Patent is hereby corrected as shown below:

Column 12,
Line 62, delete "$C_8$" and insert -- $C_6$ --.

Column 14,
Line 5, delete "the" and insert -- an --.

Signed and Sealed this

Twenty-first Day of February, 2006

JON W. DUDAS
*Director of the United States Patent and Trademark Office*